United States Patent
Matteson et al.

(10) Patent No.: US 7,164,684 B2
(45) Date of Patent: Jan. 16, 2007

(54) ETHERNET NODE HAVING HUB, SWITCH AND/OR REPEATER CHARACTERISTICS

(75) Inventors: Eric Clifton Matteson, Ruckersville, VA (US); David J. Hietanen, Charlottesville, VA (US); Anthony J. Cinalli, Harrison City, PA (US); Robert Douglas Brust, Charlottesville, VA (US)

(73) Assignee: GE FANUC Automation North America, Inc., Charlottesville, VA (US)

( * ) Notice: Subject to any disclaimer, the term of this patent is extended or adjusted under 35 U.S.C. 154(b) by 737 days.

(21) Appl. No.: 09/681,677

(22) Filed: May 18, 2001

(65) Prior Publication Data

US 2002/0172224 A1   Nov. 21, 2002

(51) Int. Cl.
 *H04L 12/56* (2006.01)
(52) U.S. Cl. .................................. 370/401; 370/421
(58) Field of Classification Search ........ 370/401–406, 370/419, 420, 908–911, 392, 412, 432, 396, 370/315, 216, 217–229, 397, 398, 395.1, 370/351, 409, 367; 709/220, 221, 222, 246, 709/238, 236, 249–253
See application file for complete search history.

(56) References Cited

U.S. PATENT DOCUMENTS

| | | | |
|---|---|---|---|
| 5,107,490 A | | 4/1992 | Wilson et al. |
| 5,295,012 A | | 3/1994 | Wilson et al. |
| 5,414,708 A | | 5/1995 | Webber et al. |
| 5,432,775 A | * | 7/1995 | Crayford ................. 370/248 |
| 5,432,907 A | * | 7/1995 | Picazo et al. ............ 709/249 |
| 5,465,254 A | | 11/1995 | Wilson et al. |
| 5,504,738 A | | 4/1996 | Sambamurthy et al. |
| 5,521,910 A | * | 5/1996 | Matthews ................ 370/256 |
| 5,533,018 A | | 7/1996 | DeJager et al. |
| 5,610,903 A | * | 3/1997 | Crayford ................. 370/213 |
| 5,617,418 A | | 4/1997 | Shirani et al. |
| 5,648,956 A | | 7/1997 | Sambamurthy et al. |
| 5,657,314 A | | 8/1997 | McClure et al. |
| 5,687,174 A | | 11/1997 | Edem et al. |
| 5,720,032 A | * | 2/1998 | Picazo et al. ............ 709/250 |
| 5,737,525 A | * | 4/1998 | Picazo et al. ............ 709/249 |
| 5,742,602 A | * | 4/1998 | Bennett .................... 370/401 |
| 5,742,760 A | * | 4/1998 | Picazo et al. ............ 709/249 |
| 5,761,529 A | | 6/1998 | Raji et al. |
| 5,771,349 A | * | 6/1998 | Picazo et al. ............ 726/21 |
| 5,790,546 A | * | 8/1998 | Dobbins et al. ......... 370/400 |
| 5,805,816 A | * | 9/1998 | Picazo et al. ............ 709/223 |
| 5,836,785 A | | 11/1998 | Lee |
| 5,841,990 A | * | 11/1998 | Picazo et al. ............ 709/249 |

(Continued)

*Primary Examiner*—Brenda Pham
(74) *Attorney, Agent, or Firm*—Mark A. Conklin; Armstrong Teasdale LLP

(57) ABSTRACT

A method for forming a network is disclosed with the network including a plurality of communication devices, a wire network for allowing a plurality of communication transmissions between the communications devices, and at least one connectivity device connected to the wire network,. The method includes utilizing the connectivity device to bring segments of the wire network together such that the communication devices are interconnected, utilizing the connectivity device to provide communication transmissions to the communications devices with independent paths through the wire network such that communication collisions are reduced, utilizing the connectivity device to regenerate a communication signal such that the distance between the communications device is extended, and utilizing the connectivity device to route communication transmissions by the communications devices through the wire network.

22 Claims, 3 Drawing Sheets

U.S. PATENT DOCUMENTS

| | | | |
|---|---|---|---|
| 6,006,275 A | * 12/1999 | Picazo et al. | 709/249 |
| 6,070,187 A | * 5/2000 | Subramaniam et al. | 709/220 |
| 6,070,193 A | 5/2000 | Segal | |
| 6,650,631 B1 | * 11/2003 | Benash et al. | 370/352 |
| 6,757,357 B1 | * 6/2004 | Horton et al. | 379/9.03 |
| 2001/0012296 A1 | * 8/2001 | Burgess et al. | 370/392 |

* cited by examiner

ETHERNET NODE HAVING HUB, SWITCH AND/OR REPEATER CHARACTERISTICS

BACKGROUND OF INVENTION

This invention relates generally to computer networks, such as local area networks (LAN), and more specifically to network devices, such as network nodes, hubs, switches, repeaters and routers used in constructing such networks.

In known network systems, especially small to medium sized control systems, separate hubs, switches, repeaters, and routers are used when creating a network. Hubs are used to bring media segments together in a central location, switches are used to provide each network transmission with an independent path through the network free of collisions with other network transmissions, repeaters are used to extend the distance covered by the network, and routers are used to route communication signals through the network. The use of hubs, switches, repeaters, and routers is an impediment to the customer in utilizing a network, such as an Ethernet network, because they add cost, devices and complexity in the creation of small to medium sized thin-wire or fiber network installations.

SUMMARY OF INVENTION

In one aspect, a method is provided for forming a network which includes a plurality of communication devices, a wire network for allowing a plurality of communication transmissions between the communications devices, and at least one connectivity device connected to the wire network. The method comprises utilizing the connectivity device to bring segments of the wire network together such that the communication devices are interconnected, utilizing the connectivity device to provide communication transmissions by the communications devices with independent paths through the wire network such that communication collisions are reduced, utilizing the connectivity device to regenerate a communication signal such that the distance between the communications device is extended, and utilizing the connectivity device to route communication transmissions by the communications devices through the wire network.

In another aspect, a network system is provided which comprises a plurality of communications devices configured to communicate with each other, a wire network configured to interconnect said communications devices and allow a plurality of communication transmissions between said communication devices, and a network connectivity device connected to said wire network. The connectivity device is configured to bring segments of said wire network together such that said communication devices are interconnected, provide communication transmissions by said communications devices with independent paths through said wire network such that communication collisions are reduced, amplify communication transmissions such that the distance between said communications device is extended, and route communication transmissions through said wire network.

In yet another aspect, a network connectivity device is provided which comprises a central processing unit connected to a electronic storage device, a hub module, a switch module, a repeater module and a router module. The connectivity device is connected to a wire network interconnecting a plurality of communication devices and further configured to utilize said hub module to bring segments of the wire network together, utilize said switch module to provide communication transmissions by the communications devices with independent paths through the wire network such that communication collisions are reduced, utilize said repeater module to amplify communication transmissions such that the distance between the communications devices is extended, and utilize said router module to route communication transmissions through the wire network.

DETAILED DESCRIPTION

Figure 1:
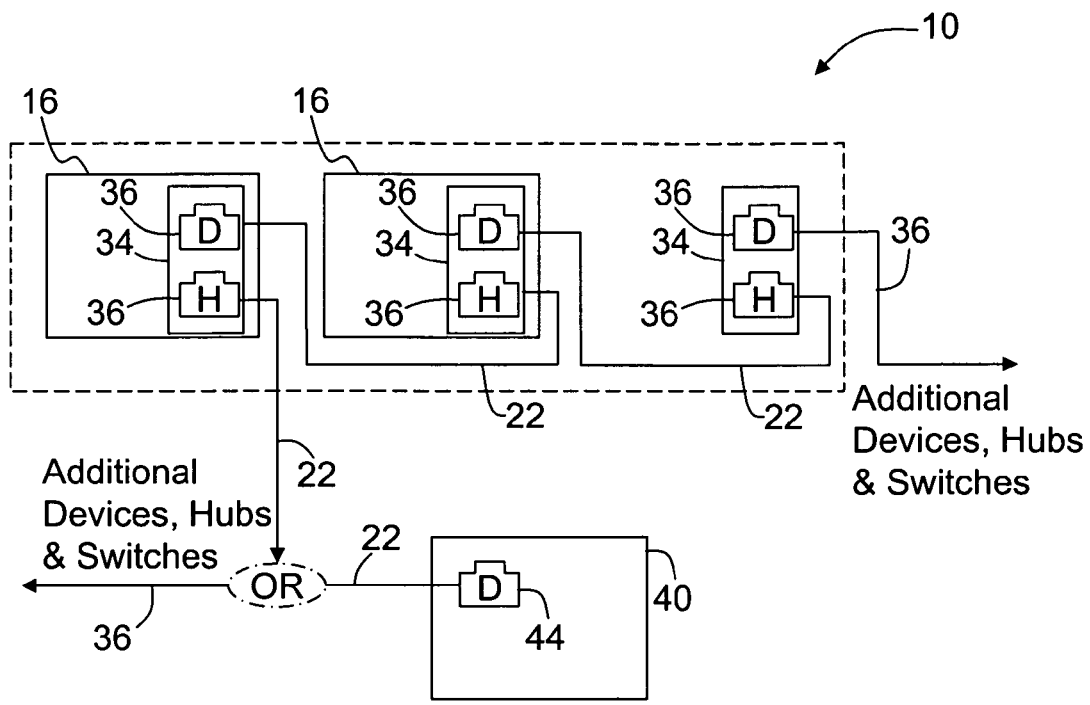
FIG. 1 is a schematic diagram of a network having a daisy-chain topology, which implements a connectivity device of the present invention.

FIG. 1 is a schematic diagram of a network 10 including a plurality of communication devices 16, such as computers, programmers, programmable logic controllers, storage devices, servers, printers and other commonly used network devices, capable of transmitting and receiving communication transmissions, a plurality of interconnecting network wires 22 that carry communication transmissions between communications devices 16, and a plurality of network connectivity devices 34, such as network nodes, connected to interconnecting wires 22 forming network 10. Interconnecting wires 22, are any devices suitable to carry data and communication transmissions, such as coaxial cable, or fiber optic cable. Connectivity device 34 includes at least one connection port 36, such as a hub port or a device port. FIG. 1 shows connectivity device 34 having two connection ports 36, a hub port and a device port, however in alternate embodiments connectivity device 34 includes one, two, or more connection ports 36. In one embodiment, network 10 is a local area network (LAN) and connectivity device 34 is implemented in a circuit card, such as an Ethernet card.

In an exemplary embodiment, connectivity device 34 has at least one of a hub, switch, repeater, and router characteristics so that network 10 is constructed without using individual hub, switch, repeater, or router devices. In typical networks, hubs are used to bring segments of network wire, such as wire 22, together, thereby interconnecting communication devices, such as communication devices 16 and switches are used to provide communication transmissions by communication devices with independent paths through a network reducing the opportunity for communication collisions with other communication transmissions. Additionally, in typical networks, repeaters amplify a signal to extend the distance between communication devices on the network, and routers route communication signal through the network. Connectivity device 34 is wired as at least one of a hub, a switch, a repeater, and a router, has electrical components similar to at least one of a hub, a switch, a repeater, and a router, has software capabilities similar to at least one of a hub, a switch, a repeater, and a router, and functions as at least one of a hub, a switch, a repeater, and a router.

Additionally, since connectivity device 34 has at least one of hub, switch, repeater, and router characteristics, connectivity device 34 has flexibility of use such that connectivity device 34 will operate without modification in a network that utilizes at least one of known hubs, switches, repeaters and routers. Thus, connectivity device is capable of being utilized in existing network systems having individual hub, switch, repeater, and/or router devices, and in constructing new network systems absent individual hub, switch, repeater, and/or router devices. Furthermore, as shown in FIG. 1, connectivity device 34 has the versatility to be implemented in network 10 as a stand-alone processing device and/or as a node connected at communications devices 16.

Further yet, connectivity device 34 provides network 10 with a single point of connect (SPOC) at connectivity devices 34 in network 10 where an open port 36 exists. SPOC provides the ability to add and remove network devices, such as hubs, switches, repeaters, routers, connectivity devices 34, and communication devices 16, by connecting and removing the device to and from any available port 36. Also, connectivity device 34 provides flexibility in the topology of any network, such as network 10. For example, without modifying connectivity device 34, connectivity device 34 is utilized in networks having daisy-chain, Ring, and star topologies. Additionally, connectivity device 34 operates without modification in a network having mixed topologies. Thus, a network topology can be changed from one topology to another without modifying connectivity device 34 or any existing network components.

FIG. 1 illustrates network 10 having a daisy-chain topology and implementing connectivity device 34 as a node at a plurality of communications device 16 and as a stand alone network device. Additionally, FIG. 1 illustrates how connectivity devices 34 provide SPOC to add network devices to network 10. For example, an additional communication device 40, such as a programmer, is connected to network 10 using an additional wire 22 to connect connection port 44, of device 40, to an available connection port 36 on communication device 16. Communication devices 40 may be added or removed from available ports 36 without effecting operation of network 10. Furthermore, network 10 is expandable to include at least one additional, stand alone connectivity device 34, communication device 16, hub (not shown), switch (not shown), repeater (not shown) and/or router (not shown). Although FIG. 1 shows communication device 40 connected to network 10 at port 44, in another embodiment (not shown) communication device 40 is connected to network 10 using a connectivity device 34 implemented as node at device 40.

Figure 2:
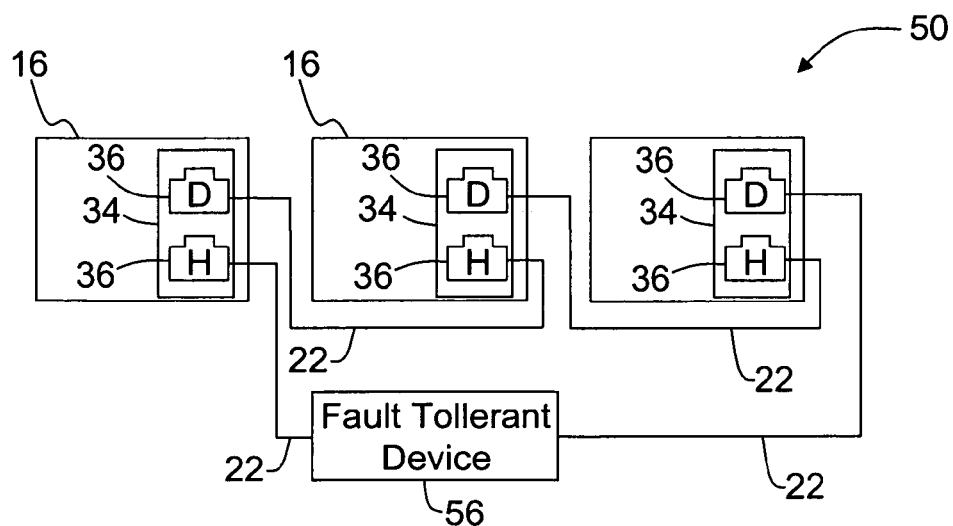
FIG. 2 is a schematic diagram of a network having a ring topology, which implements the connectivity device of the present invention.

FIG. 2 is a schematic diagram of a network 50 illustrating a network ring topology. Components in network 50 identical to components in network 10 (shown in FIG. 1) are identified in FIG. 2 using the same reference numerals as used in FIG. 1. Network 50 includes a plurality of communication devices 16, such as computers, programmers, storage devices, controllers, servers, printers and other commonly used network devices, capable of transmitting, receiving, and processing communication transmissions. Additionally, network 50 includes a plurality of interconnecting wires 22 that carry communication transmissions between communications devices 16, and a plurality of network connectivity devices 34, such as network nodes, connected to communication devices 16 and interconnecting wires 22 forming network 50. Connectivity device 34 includes at least one connection port 36, such as a hub port or a device port. Additionally, network 50 includes a fault tolerant network device 56. FIG. 2 shows network 50 having three communication devices 16. However, since connectivity device 34 has hub, switch, repeater, and router characteristics, network 50 is expandable such that additional communication devices 16 can be added or removed without modification of connectivity device 34 or other network devices connected to network 50. Additionally, each connectivity device 34 provides flexibility in configuration of network 50 such that at least one of hubs, switches, repeaters (not shown) and routers (not shown) can be added to network 50 without modification of connectivity devices 34 or other existing network components.

Connectivity device 34 operates in network 50 using redundancy to detect faults. In one embodiment, network 50 has redundant connections to connectivity devices 34, via fault tolerant device 56, so that faults can be detected in network 50 without effecting operation of communication device 16 or communications on network 50. Fault tolerant device 56 is any network device having fault tolerant characteristics, such as a hub, a switch, a repeater, a router and a communications device 16.

Ring topology requires fault tolerant capability in at least one network device, such as fault tolerant device 56, to protect against faults in network 50. For example, if a standard network programmer, that does not use connectivity device 34 as a node, is temporarily connected to network 50 by breaking connection of wire 22, because the programmer lacks connectivity device 34, the temporary addition of the programmer will temporarily reduce fault tolerance of network 50. In an alternate embodiment, connectivity device 34 incorporates fault tolerant characteristic such that the network device using connectivity device 34 as node becomes a fault tolerant device.

Figure 3:
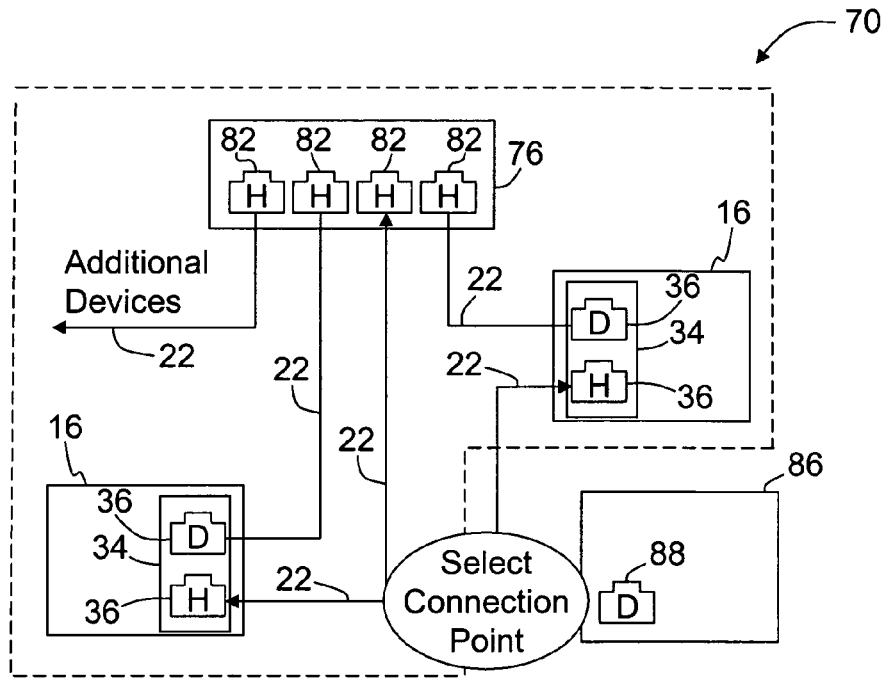
FIG. 3 is a schematic diagram of a network having a star topology, which implements the connectivity device of the present invention.

FIG. 3 is a schematic diagram of a network 70 illustrating a network star topology. Components in network 70 identical to components in network 10 (shown in FIG. 1) are identified in FIG. 3 using the same reference numerals as used in FIG. 1. Network 70 includes a plurality of communication devices 16, such as computers, programmers, storage devices, servers, printers and other commonly used network devices, capable of processing, transmitting and receiving communication transmissions. Additionally, network 70 includes a plurality of interconnecting wires 22 that carry communication transmissions between communications devices 16, a central connection device 76, and a plurality of network connectivity devices 34, such as network nodes, connected to communication devices 16 and interconnecting wires 22 forming network 70. Connectivity device 34 includes at least one connection port 36, such as a hub port or a device port. Additionally, central connection device 76 includes a plurality of connection ports 82, such as a hub port.

In one embodiment, central connection device 76 is a hub, and is a central connection point for interconnecting communication devices 16 and other network devices (not shown). Communications devices 16 and other network devices are connected to central connection device 76 using wires 22, which are connected at open ports 36 of connectivity devices 34. In yet another embodiment, central connection device 76 is a switch, thereby providing communication transmissions from communication devices 16 with independent paths through, into and out of network 70. Since connectivity device 34 has hub, switch, repeater and router characteristics, no modification to connectivity device 34 is needed for implementation in network 70. Furthermore, additional communication devices 16, other network devices, hubs, switches, repeaters, and routers can be added to network 70 without modification to connectivity device 34 or existing network devices.

Connectivity device 34 provides network 70 with a single point of connect (SPOC) such that communication devices 16 are added to network 70 by connecting the additional communication device 16 to any open communication port e.g. port 36 or port 82. For example, a communication device 86, such as a programmer, is added to network 70 by using additional wire 22 to connect a connection port 88, of device 86, to an available connection port 36 of connectivity device 34, or connection port 82 of central connection device 76. Other network components, hubs, switches, repeaters, and routers are added and removed in the same manner. Although FIG. 3 shows communication device 86 using port 88 to connect to network 70, in another embodiment (not shown) communication device 86 is connected to network 70 using a connectivity device 34 as a node at device 86.

Figure 4:
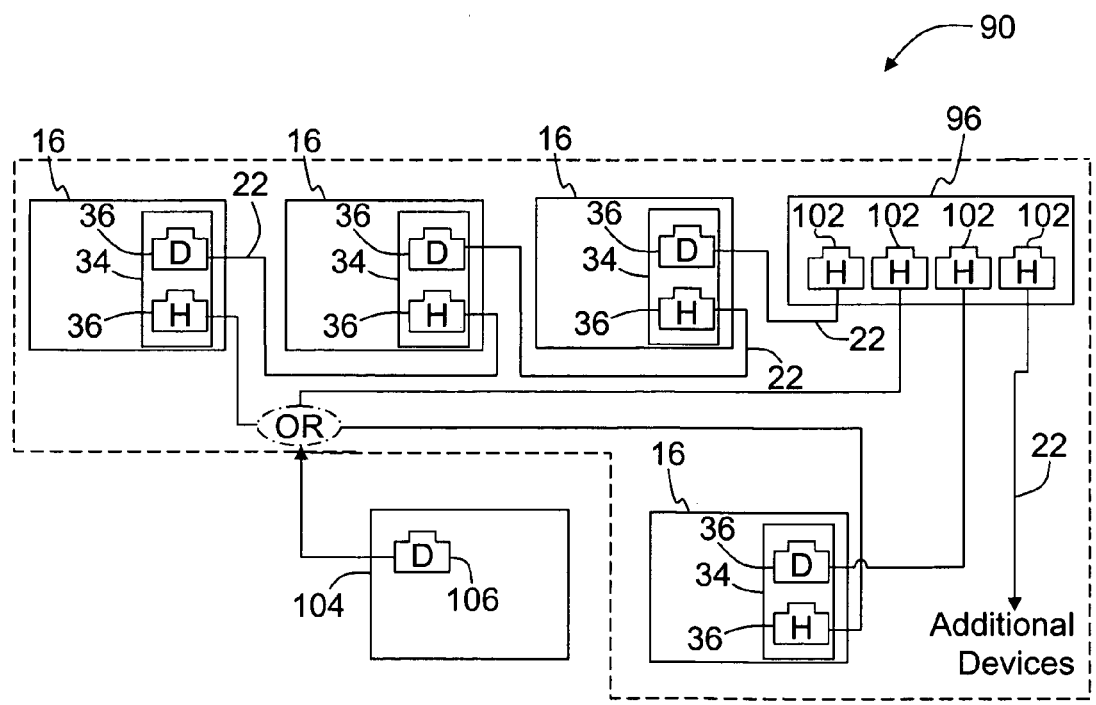
FIG. 4 is a schematic diagram of a network having a mixed topology, which implements the connectivity device of the present invention.

FIG. 4 is a schematic diagram of a network 90 illustrating a network having a mixed topology. Components in network 90 identical to components in network 10 (shown in FIG. 1) are identified in FIG. 4 using the same reference numerals as used in FIG. 1. Network 90 includes a plurality of communication devices 16, such as computers, programmers, storage devices, controllers, servers, printers and other commonly used network devices, each capable of processing, transmitting and receiving communication transmissions. Additionally, network 90 includes a plurality of interconnecting wires 22 that carry communication transmissions between communications devices 16, a central connection device 96, and a plurality of network connectivity devices 34, such as network nodes, connected to communication devices 16 and interconnecting wires 22 forming network 90. Connectivity device 34 includes at least one connection port 36, such as a hub port or a device port. Additionally, central connection device 96 includes a plurality of connection ports 102, such as hub ports. Network 90 has one communication device 16 independently connected to central connection device 96 and a plurality of communication devices 16, configured in a daisy-chain topology also connected to central connection device 96.

In one embodiment central connection device 96 is a hub providing a central connection point for interconnecting independently connected communication devices 16 with each other and with a plurality of communication devices 16 connected in a daisy-chain topology. In another embodiment, central connection device 96 is a switch, thereby providing communication transmissions from independently connected communication devices 16, and daisy-chained communication devices 16, with an independent path through, into and out of network 90. Connectivity devices 34 provide hub, switch, repeater, and router features for communication devices 16 configured in a daisy-chain or ring (not shown) topology. Since connectivity device 34 has hub, switch, repeater, and router characteristics, no modification to connectivity device 34 is needed for implementation in network 90. Furthermore, additional communication devices 16, other network devices, hubs, switches, repeaters, and routers can be added to network 90 without modification to connectivity device 34 or existing network devices.

Connectivity device 34 provides network 90 with a single point of connect (SPOC) such that communication devices 16 are added to network 90 by connecting the additional communication device 16 to any open communication port 36 or 102. For example, a communication device 104, such as a programmer, is added to network 90 by using additional wire 22 to connect a connection port 106, of device 104, to an available connection port 36 of connectivity device 34, or connection port 102 of central connection device 96. Other network components, hubs, switches, repeaters, and routers are added and removed in the same manner. Although FIG. 4 shows communication device 104 using port 106 to connect to network 90, in another embodiment (not shown) communication device 104 is connected to network 90 using a connectivity device 34 as a node at device 104.

Figure 5:
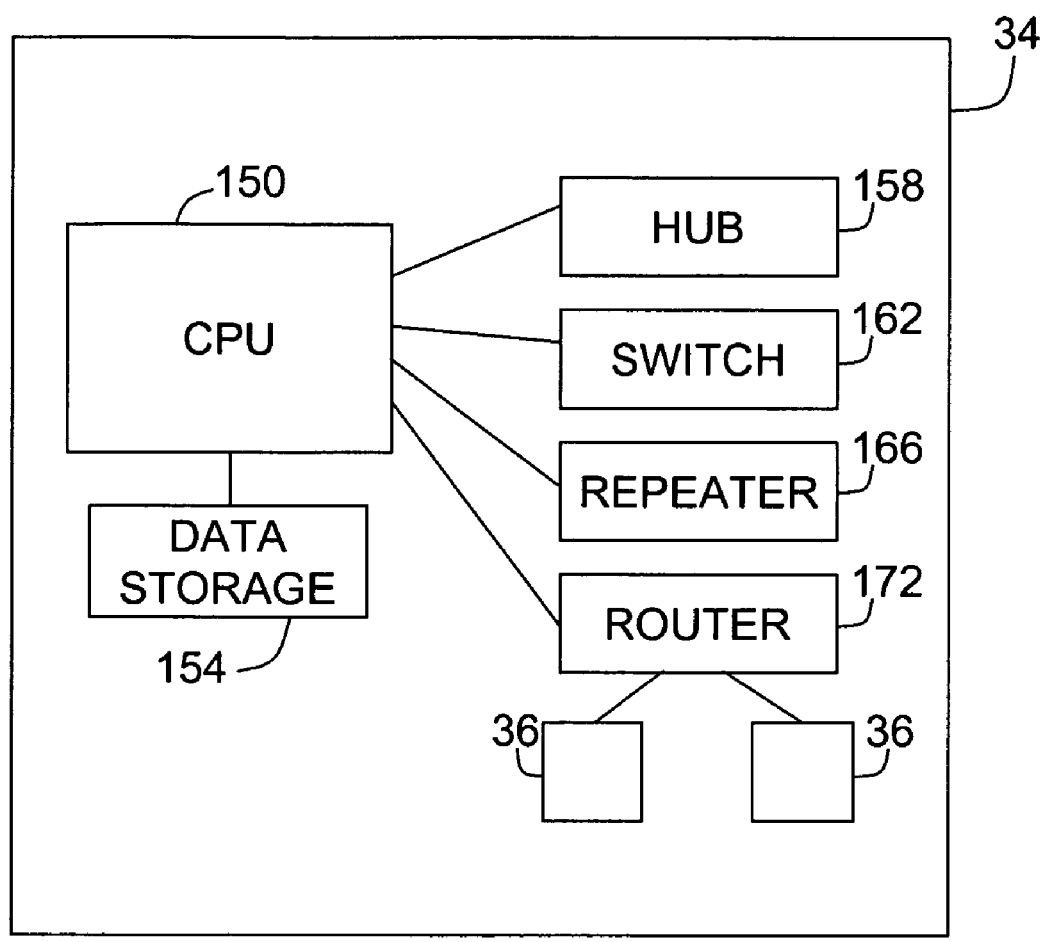
FIG. 5 is a detailed diagram of the connectivity device utilized in the system shown in FIG. 1.

FIG. 5 is a detailed diagram of connectivity device 34. In an exemplary embodiment, connectivity device 34 includes a central processing unit (CPU) 150 connected to, an electronic data storage device 154, a hub module 158, a switch module 162, a repeater module 166, a router module 172, and at least one connection port 36. CPU 150 utilizes communications with storage device 154, hub module 158, switch 162, repeater 166, router 172, and port 36, to execute functions of connectivity device 34. Connectivity device 34 is connected to a network (not shown), such as network 10, shown in FIG. 1, via port 36. Hub module 158 functions as a network hub, switch module 162 functions as a network switch, repeater module 166 functions as a network repeater, and router module 172 functions as a network router, thereby enabling connectivity device 34 with at least one of hub, switch, repeater, and router characteristics. Although FIG. 5 shows connectivity device 34 having individual modules 158, 162, 166, and 172, in an alternate embodiment, connectivity device 34 includes a single module (not shown). The single module functions as at least one of hub module 158, switch module 162, repeater module 166, and router module 172, thereby enabling connectivity device 34 with hub, switch, repeater, and/or router characteristics. Additionally, although FIG. 5 shows modules 158, 162, 166, and 172 separate from CPU 150, in another embodiment the functions of modules 158, 162, 166, and 172 are performed by CPU 150, thereby enabling connectivity device 34 with hub, switch, repeater, and/or router characteristics.

The connectivity device of the present invention has hub, switch, repeater, and router characteristics, providing flexibility in network topologies without the need for standard network hubs, switches, repeaters, and/or routers thereby permitting the reduction of the number of standard network hubs, switches, repeaters, and routers required in the construction of a network. Additionally, the connectivity device provides networks with a SPOC for easy addition and removal of communication devices. For example, devices such as programmable logic controllers (PLCs), stand alone central processing units (CPUs), various type of industrial processing devices having CPUs, and input/output (I/O) racks, can be added or removed from an existing network incorporating the connectivity device without the need for adding or removing hubs, switches, routers and/or repeaters. Additionally, a network can be constructed free of standard network hubs, switches, routers, and repeaters, by incorporating the connectivity device. For example, a network including devices such as PLCs, CPUs, and I/O racks can be constructed by using the connectivity device as a stand alone device within the network or using the connectivity device in combination with network devices, or both.

While the invention has been described in terms of various specific embodiments, those skilled in the art will recognize that the invention can be practiced with modification within the spirit and scope of the claims.

The invention claimed is:

1. A method for forming a network including a plurality of communication devices, a wire network for allowing a plurality of communication transmissions between the communications devices, and at least one connectivity device connected to the wire network, said method comprising the steps of:

utilizing the connectivity device to perform a repeater function including regenerating a communication signal such that the distance between the communications device is extended;

utilizing the connectivity device to perform a routing function including routing communication transmissions by the communications devices through the wire network; and communicating, by a central processing unit located within the connectivity device, with a network hub device located within the connectivity device and a network switch device located within the connectivity device, wherein the network hub device performs a hub function including interconnecting the communication devices by bringing segments of the wire network together, and the network switch device performs a switching function including reducing communication collisions by providing communication transmissions from the communications devices with independent paths through the wire network; and integrating, within the connectivity device, a first function set and a second function set, wherein the first function set includes a print function other than the hub function, the switching function, the routing function, and the repeater function, and the second function set includes at least one of the hub function, the switching function, the routing function, and the repeater function.

2. A method in accordance with claim 1 further comprising the steps of:

connecting one of the connectivity devices to a communications device; and connecting the communications device to the wire network utilizing the connectivity device.

3. A method in accordance with claim 1 further comprising the step of configuring the wire network to include at least one of the network hub device, the network switch device, a network repeater device and a network router device.

4. method in accordance with claim 1 further comprising the step of utilizing the connectivity device in a wire network having a topology of at least one of a daisy-chain configuration, a ring configuration, and a star configuration.

5. A method in accordance with claim 1 further comprising the step of utilizing the connectivity device to enable Single Point of Connect (SPOC) capability within the wire network.

6. A method in accordance with claim 1 further comprising the step of utilizing the connectivity device as at least one of a network fault tolerant device and a network fault tolerant management device.

7. A network system comprising:

a plurality of communications devices configured to communicate with each other;

a wire network configured to interconnect said communications devices and allow a plurality of communication transmissions between said communication devices;

a network connectivity device connected to said wire network, said network connectivity device configured to:

perform a repeater function including amplifying communication transmissions such that the distance between said communications device is extended; and perform a routing function including routing communication transmissions through said wire network; and a central processing unit located within said network connectivity device and configured to communicate with a network hub device located within said network connectivity device and a network switch device located within said network connectivity device, wherein said network hub device configured to perform a hub function including interconnecting said communication devices by bringing segments of said wire network together, said network switch device configured to perform a switching function including reducing communication collisions by providing communication transmissions from said communications devices with independent paths through said wire network, and said network connectivity device configured to integrate a first function set and a second function set, wherein the first function set includes a print function other than the hub function, the switching function, the routing function, and the repeater function, and the second function set includes at least one of the hub function, the switching function, the routing function, and the repeater function.

8. A system in accordance with claim 7 wherein each said communication device is connected to said wire network using said network connectivity device.

9. A system in accordance with claim 7 wherein said network system further comprises at least one of the network hub device, the network switch device, a network repeater device, and a network router device.

10. A system in accordance with claim 7 wherein said wire network comprises a means suitable for carrying data and communication transmissions.

11. A system in accordance with claim 7 wherein said network connectivity device configured to operate when said wire network uses a topology of at least one of a daisy-chain configuration, a ring configuration, and a star configuration.

12. A system in accordance with claim 7 wherein said network connectivity device further configured to enable SPOC capability within said network system.

13. A system in accordance with claim 7 wherein said network connectivity device further configured to function as at least one of a network fault tolerant device and a network fault management device.

14. A network connectivity device comprising a central processing unit connected to a electronic storage device, a hub module, a switch module, a repeater module and a router module, said connectivity device connected to a wire network interconnecting a plurality of communication devices, said connectivity device configured to:

utilize said router module to perform a routing function including routing communication transmissions through the wire network, wherein said connectivity device includes a central processing unit configured to communicate with said hub module located within said connectivity device and said switch module located within said connectivity device, said repeater module configured to perform a repeater function including amplifying communication transmissions to extend a distance between the communications devices, said hub module configured to perform a hub function including bringing segments of the wire network together, and said switch module configured to perform a switching function including reducing communication collisions by providing communication transmissions from the communications devices with independent paths through the wire network, and said connectivity device configured to integrate a first function set and a second function set, wherein the first function set includes a print function other than the hub function, the switching function, the routing function, and the repeater function, and the second function set includes at least one of the hub function, the switching function, the routing function, and the repeater function.

15. A network connectivity device in accordance with claim 14 further configured to connect at least one communication device to a wire network.

16. A network connectivity device in accordance with claim 14 further configured to function in a network system comprising at least one of a network hub, a network switch, a network repeater, and a network router.

17. A network connectivity device in accordance with claim 14 further configured to function in a network system having a topology comprising at least one of a daisy-chain configuration, a ring configuration and a star configuration.

18. A network connectivity device in accordance with claim 14 further configured to be at least one of a network fault tolerant device and a network fault tolerant management device.

19. A network connectivity device in accordance with claim 14 further configured to enable SPOC capabilities with a network system.

20. A network connectivity device in accordance with claim 14 wherein said connectivity device is a network node utilized in a communications network system comprising a plurality of communications devices interconnected by a wire network.

21. A method in accordance with claim 1 wherein said integrating, within the connectivity device, the first function set and the second function set comprises integrating, within a circuit card, the first function set and the second function set.

22. A method in accordance with claim 1 wherein the first function set includes a programming function.

* * * * *

UNITED STATES PATENT AND TRADEMARK OFFICE
CERTIFICATE OF CORRECTION

PATENT NO. : 7,164,684 B2
APPLICATION NO. : 09/681677
DATED : January 16, 2007
INVENTOR(S) : Matteson et al.

It is certified that error appears in the above-identified patent and that said Letters Patent is hereby corrected as shown below:

In Claim 4, column 7, line 42, before "method" insert -- A --.

Signed and Sealed this

Fourth Day of March, 2008

JON W. DUDAS
*Director of the United States Patent and Trademark Office*